United States Patent
Ma

(10) Patent No.: US 9,237,479 B2
(45) Date of Patent: Jan. 12, 2016

(54) METHOD AND DEVICE FOR DATA TRAFFIC DISTRIBUTION

(71) Applicant: Huawei Technologies Co., Ltd., Shenzhen (CN)

(72) Inventor: Tao Ma, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 253 days.

(21) Appl. No.: 13/909,637

(22) Filed: Jun. 4, 2013

(65) Prior Publication Data

US 2014/0036705 A1    Feb. 6, 2014

(30) Foreign Application Priority Data

Aug. 2, 2012  (CN) .......................... 2012 1 0273160

(51) Int. Cl.
*H04W 28/02* (2009.01)
*H04W 48/18* (2009.01)
*H04W 48/16* (2009.01)

(52) U.S. Cl.
CPC .......... *H04W 28/0231* (2013.01); *H04W 48/18* (2013.01); *H04W 48/16* (2013.01)

(58) Field of Classification Search
None
See application file for complete search history.

(56) References Cited

U.S. PATENT DOCUMENTS

| | | | | |
|---|---|---|---|---|
| 2006/0013179 | A1* | 1/2006 | Yamane | 370/338 |
| 2007/0180088 | A1* | 8/2007 | Zhao | 709/223 |
| 2011/0170484 | A1* | 7/2011 | Nagai et al. | 370/328 |
| 2012/0082131 | A1* | 4/2012 | Agrawal et al. | 370/331 |
| 2013/0322329 | A1* | 12/2013 | Visuri et al. | 370/328 |

FOREIGN PATENT DOCUMENTS

| | | |
|---|---|---|
| CN | 101765186 A | 6/2010 |
| CN | 101951652 A | 1/2011 |
| CN | 102118815 A | 7/2011 |
| CN | 202121784 U | 1/2012 |
| CN | 102438079 A | 5/2012 |
| WO | WO 2008/106353 A2 | 9/2008 |

* cited by examiner

*Primary Examiner* — Benjamin H Elliott, IV
(74) *Attorney, Agent, or Firm* — Brinks Gilson & Lione

(57) ABSTRACT

The present invention provides a method and a device for data traffic distribution. The method includes: measuring, by a mobile wireless interconnection wifi device, signal strength of a wifi network; and switching, by the mobile wifi device, data traffic between a cellular wireless communication network and the wifi network according to the signal strength of the wifi network, where, when the data traffic is transmitted over the wifi network, the mobile wifi device, by means of time division multiplexing, serves as an access point AP and a station STA respectively to route the data traffic between STAs having an Internet access demand and APs capable of providing an Internet access service. The embodiments of the present invention can implement data distribution in the scenario of multiple WAN ports.

20 Claims, 11 Drawing Sheets

METHOD AND DEVICE FOR DATA TRAFFIC DISTRIBUTION

CROSS-REFERENCE TO RELATED APPLICATIONS

This application claims priority to Chinese Patent Application No. 201210273160.4, filed on Aug. 2, 2012, which is hereby incorporated by reference in its entirety.

TECHNICAL FIELD

The present invention relates to mobile communication technologies, and in particular, to a method and a device for data traffic distribution.

BACKGROUND

Along with the development of mobile communication technologies, a user may access a wide area network (wide area network, WAN) in various manners, for example, a WAN port on a mobile wireless interconnection (wireless fidelity, wifi) device may include an Ethernet (Ethernet) port, a wifi station (station, STA) port, and a 2 G/3G/4G (second-generation/third-generation/fourth-generation mobile communication technologies) port, and the user may access the WAN in any one of the three manners. However, when the user uses the 2G/3G/4G port to transmit data, a large burden is caused to an operator network. Different from the operator network, a local area network (Local Area Network, LAN) usually uses a wifi network to access a wired network, for example, to access an optical fiber network, but the signal quality of the wifi network is usually unstable. On the premise of a stable data service, decision on using the 2G/3G/4G network or the wifi network to perform data transmission is a problem.

SUMMARY

Embodiments of the present invention provide a method and a device for data traffic distribution, which implement data distribution between a cellular wireless communication network and a wifi network on the premise of ensuring communication quality.

In one aspect, a method for data traffic distribution is provided, including:

measuring, by a mobile wireless interconnection wifi device, signal strength of a wifi network; and switching, by the mobile wifi device, data traffic between a cellular wireless communication network and the wifi network according to the signal strength of the wifi network, where, when the data traffic is transmitted over the wifi network, the mobile wifi device, by means of time division multiplexing, serves as an access point AP and a station STA respectively to route the data traffic between STAs having an Internet access demand and APs capable of providing an Internet access service.

In one possible implementation manner, the measuring signal strength of a wifi network includes: when performing a cellular wireless communication data service, respectively performing channel scanning on each to-be-searched channel of at least one to-be-searched channel in the wifi network, to obtain an available AP from the APs capable of providing the Internet access service on each to-be-searched channel and the signal strength of the available AP; and the switching data traffic between a cellular wireless communication network and the wifi network according to the signal strength of the wifi network includes:

determining the AP with signal strength greater than a preset first threshold or a weighted average value of multiple values of the signal strength greater than the first threshold as a target AP;

performing a wifi access process on the channel where the target AP is located so as to access the wifi network; and after accessing the wifi network successfully, re-obtaining the signal strength of the target AP, and if the re-obtained signal strength is greater than a preset second threshold, switching the data traffic from the cellular wireless communication network to the wifi network.

In another possible implementation manner, the respectively performing channel scanning on each to-be-searched channel of at least one to-be-searched channel in the wifi network, to obtain an available AP from the APs capable of providing the Internet access service on each to-be-searched channel and the signal strength of the available AP includes:

respectively performing a preset number of times of channel scanning on each to-be-searched channel in the wifi network, where each time the channel scanning is performed, the available AP on each to-be-searched channel and the signal strength of the available AP are obtained.

In another possible implementation manner, when there is more than one available AP with the signal strength greater than the first threshold, or when there is more than one available AP with the weighted average value of multiple values of the signal strength greater than the first threshold, the target AP is an AP with the highest priority in the more than one AP, and the priority is determined by a pre-configured parameter indicating an AP selection sequence.

In another possible implementation manner, the obtaining the available AP on each to-be-searched channel and the signal strength of the available AP each time the channel scanning is performed includes:

when the mobile wifi device reaches a preset time, selecting an initial channel, and working during a first time as the AP on the initial channel;

after the mobile wifi device works during the first time, switching to one to-be-searched channel;

working, by the mobile wifi device, during a second time as the STA on the one to-be-searched channel, and detecting the available AP on the one to-be-searched channel and the signal strength of the available AP on the one to-be-searched channel;

after the mobile wifi device works during the second time, switching back to the initial channel;

after the mobile wifi device works during the first time as the AP again on the initial channel, switching to work during the second time as the STA on another to-be-searched channel, detecting the available AP on the another to-be-searched channel and the signal strength of the available AP on the another to-be-searched channel, and switching back to the initial channel after working during the second time; and repeating, by the mobile wifi device, the above process until all the to-be-searched channels of the at least one to-be-searched channel are detected.

In another possible implementation manner, the performing a wifi access process on the channel where the target AP is located includes:

performing, by the mobile wifi device, an AP release process on the initial channel;

connecting, by the mobile wifi device, to the target AP as the STA on the channel where the target AP is located; and after the mobile wifi device connects to the target AP as the STA, working as the AP on the channel where the target AP is located, so that the STAs having the access demand re-access the mobile wifi device.

In another possible implementation manner, the target AP includes a first AP, the first AP refers to an AP of the mobile wifi device failing to access for a preset number of times, and the method further includes:

no longer initiating, by the mobile wifi device, an access to the first AP before restarting; or before restarting, placing, by the mobile wifi device, a basic service set identifier BSSID of the first AP at the tail of a search queue to delay initiating the access to the first AP; or within a preset time before restarting, maintaining, by the mobile wifi device, a state of the BSSID of the first AP as an invalid state so as to no longer initiate the access to the first AP within the preset time.

In another possible implementation manner, a calculation formula of the first threshold is: L1=Y−P1+P2, where L1 is the first threshold, Y is a receiver sensitivity required by the mobile wifi device working as the AP and the STA, P1 is a transmitting power of the mobile wifi device, and P2 is a transmitting power of the target AP.

In another possible implementation manner, when the mobile wifi device works in a battery mode and works in a charger mode, P1 has different values.

In another possible implementation manner, the measuring signal strength of a wifi network includes: when performing a wifi data service, collecting multiple values of a wifi signal strength collected within a preset time and calculating a weighted average value of the multiple values of the wifi signal strength.

The switching data traffic between a cellular wireless communication network and the wifi network according to the signal strength of the wifi network includes:

if the weighted average value is lower than a preset third threshold, establishing a cellular wireless communication network connection; and after establishing the cellular wireless communication network connection, re-obtaining the weighted average value, and if the weighted average value is lower than a preset fourth threshold, switching the data traffic from the wifi network into the cellular wireless communication network.

In another possible implementation manner, the method further includes:

determining, by the mobile wifi device, whether an Ethernet port of wide area network WAN ports is capable of providing the Internet access service; and when the Ethernet port of the WAN ports is capable of providing the Internet access service, using, by the mobile wifi device, the Ethernet port to access a WAN.

In another aspect, a device for data traffic distribution is provided, including:

a measuring module, configured to measure signal strength of a wireless interconnection wifi network, and send the signal strength of the wifi network to a switching module; and the switching module, configured to receive the signal strength of the wifi network sent by the measuring module, switch data traffic between a cellular wireless communication network and the wifi network according to the signal strength of the wifi network, where, when the data traffic is transmitted over the wifi network, the mobile wifi device, by means of time division multiplexing, serves as an access point AP and a station STA respectively to route the data traffic between STAs having an Internet access demand and APs capable of providing an Internet access service.

In one possible implementation manner, the measuring module is specifically configured to: when performing a cellular wireless communication data service, respectively perform channel scanning on each to-be-searched channel of at least one to-be-searched channel in the wifi network, to obtain an available AP from the APs capable of providing the Internet access service on each to-be-searched channel and the signal strength of the available AP; and the switching module includes:

a first unit, configured to determine the AP with signal strength greater than a preset first threshold or a weighted average value of multiple values of the signal strength greater than the first threshold as a target AP;

a second unit, configured to perform a wifi access process on the channel where the target AP determined by the first unit is located so as to access the wifi network; and a third unit, configured to: after the second unit accesses the wifi network successfully, re-obtain the signal strength of the target AP, and if the re-obtained signal strength is greater than a preset second threshold, switch the data traffic from the cellular wireless communication network to the wifi network.

In another possible implementation manner, the measuring module is specifically configured to:

when performing the cellular wireless communication data service, respectively perform a preset number of times of channel scanning on each to-be-searched channel in the wifi network, where each time the channel scanning is performed, the available AP on each to-be-searched channel and the signal strength of the available AP are obtained.

In another possible implementation manner, when there is more than one available AP with the signal strength greater than the first threshold, or when there is more than one available AP with the weighted average value of multiple values of the signal strength greater than the first threshold, the target AP determined by the first unit is an AP with the highest priority in the more than one AP, and the priority is determined by a pre-configured parameter indicating an AP selection sequence.

In another possible implementation manner, the measuring module is specifically configured to:

when performing the cellular wireless communication data service, respectively perform a preset number of times of channel scanning on each to-be-searched channel in the wifi network, where the obtaining the available AP on each to-be-searched channel and the signal strength of the available AP each time the channel scanning is performed includes:

when reaching a preset time, select an initial channel, and work during a first time as the AP on the initial channel;

after working during the first time, switch to one to-be-searched channel;

work during a second time as the STA on the one to-be-searched channel, and detect the available AP on the one to-be-searched channel and the signal strength of the available AP on the one to-be-searched channel;

after working during the second time, switch back to the initial channel;

after working during the first time as the AP again on the initial channel, switch to work during the second time as the STA on another to-be-searched channel, detect the available AP on the another to-be-searched channel and the signal strength of the available AP on the another to-be-searched channel, and switch back to the initial channel after working during the second time; and repeat the above process until all the to-be-searched channels of the at least one to-be-searched channel are detected.

In another possible implementation manner, the second unit is specifically configured to:

perform an AP release process on the initial channel;

connect, as the STA, to the target AP on the channel where the target AP is located; and after connecting to the target AP as the STA, work as the AP on the channel where the target AP is located, so that the STAs having the access demand re-access the mobile wifi device.

In another possible implementation manner, the target AP includes a first AP, the first AP refers to an AP of the mobile wifi device failing to access for a preset number of times, and the device further includes:

a processing module, configured to no longer initiate an access to the first AP before restarting; or before restarting, place a basic service set identifier BSSID of the first AP at the tail of a search queue to delay initiating the access to the first AP; or within a preset time before restarting, maintain a state of the BSSID of the first AP as an invalid state so as to no longer initiate the access to the first AP within the preset time.

In another possible implementation manner, a calculation formula of the first threshold adopted by the first unit is: L1=Y−P1+P2, where L1 is the first threshold, Y is a receiver sensitivity required by the mobile wifi device working as the AP and the STA, P1 is a transmitting power of the mobile wifi device, and P2 is a transmitting power of the target AP.

In another possible implementation manner, when the device works in a battery mode and works in a charger mode, P1 has different values.

In another possible implementation manner, the measuring module is specifically configured to: when performing a wifi data service, collect multiple values of a wifi signal strength collected within a preset time and calculate a weighted average value of the multiple values of the wifi signal strength; and the switching module is specifically configured to: if the weighted average value is lower than a preset third threshold, establish a cellular wireless communication network connection; after establishing the cellular wireless communication network connection, re-obtain the weighted average value, and if the weighted average value is lower than a preset fourth threshold, switch the data traffic from the wifi network to the cellular wireless communication network.

In another possible implementation manner, the device further includes:

a first determining module, configured to determine whether an Ethernet port of wide area network WAN ports is capable of providing the Internet access service; and a first access module, configured to use, when the first determining module determines that the Ethernet port of the WAN ports is capable of providing the Internet access service, the Ethernet port to access a WAN.

It can be known from the above technical solutions, by measuring the signal strength of the wifi network, the present invention switches the data traffic between the cellular wireless communication network and the wifi network, which implements data distribution between the operator network and the wifi network on the premise of guaranteeing communication quality. In addition, during the flow distribution, the present invention, by means of time division multiplexing, respectively serves as the AP and the STA to route the data traffic between the STAs with the Internet access demand and the APs capable of providing the Internet access service, thereby implementing data traffic distribution of a single chip.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

To make the objectives, technical solutions, and advantages of the embodiments of the present invention more comprehensible, the following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
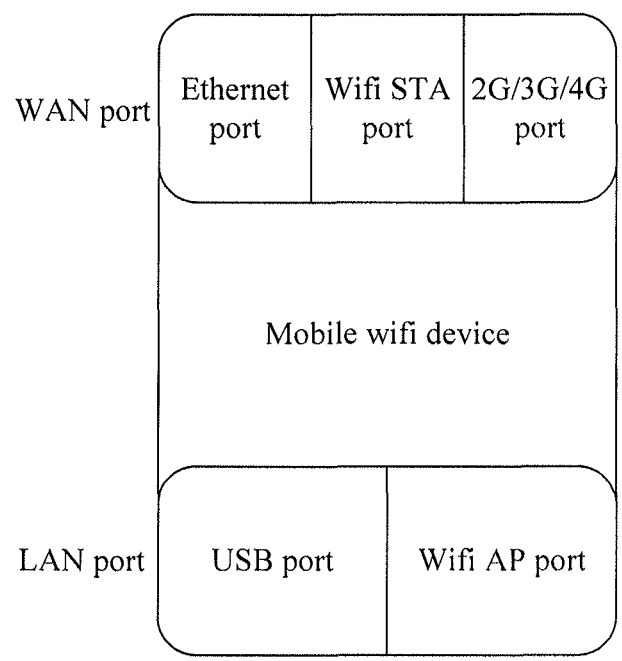
FIG. 1 is a schematic diagram of a port of a mobile wifi device according to the present invention.

The mobile wifi device in an embodiment of the present invention can be named as E5. Referring to FIG. 1, which is a schematic diagram of a port of the E5, the E5 may include a WAN port and a LAN port. The WAN port includes an Ethernet (Ethernet) port, a wifi STA port, and a cellular wireless communication network port, a 2G/3G/4G port is specifically used as an example for illustration, and the LAN port includes a universal serial bus (Universal serial bus, USB) port and a wifi access point (Access Point, AP) port. The WAN port may enable the mobile wifi device to access other access points as a device having an Internet access demand. The LAN port may enable the mobile wifi device to serve other devices having the Internet access demand as a serving node.

The E5 may work in the following scenarios.

Scenario I: The E5, by using the USB port or the wifi AP port, provides a LAN service, such as WebNAS file sharing, Samba, digital living network alliance (Digital Living Network Alliance, DLNA) streaming media playing and recording, for a user.

Scenario II: the E5 provides a WAN service to the user connected by using the USB port, and may access the Internet, surf the Internet, and the like by using WAN ports including Ethernet, Wifi STA, and 2G/3G/4G ports.

Scenario III: In combination with scenario I and scenario II, the above WAN service and LAN service are provided to the user together.

Figure 2:
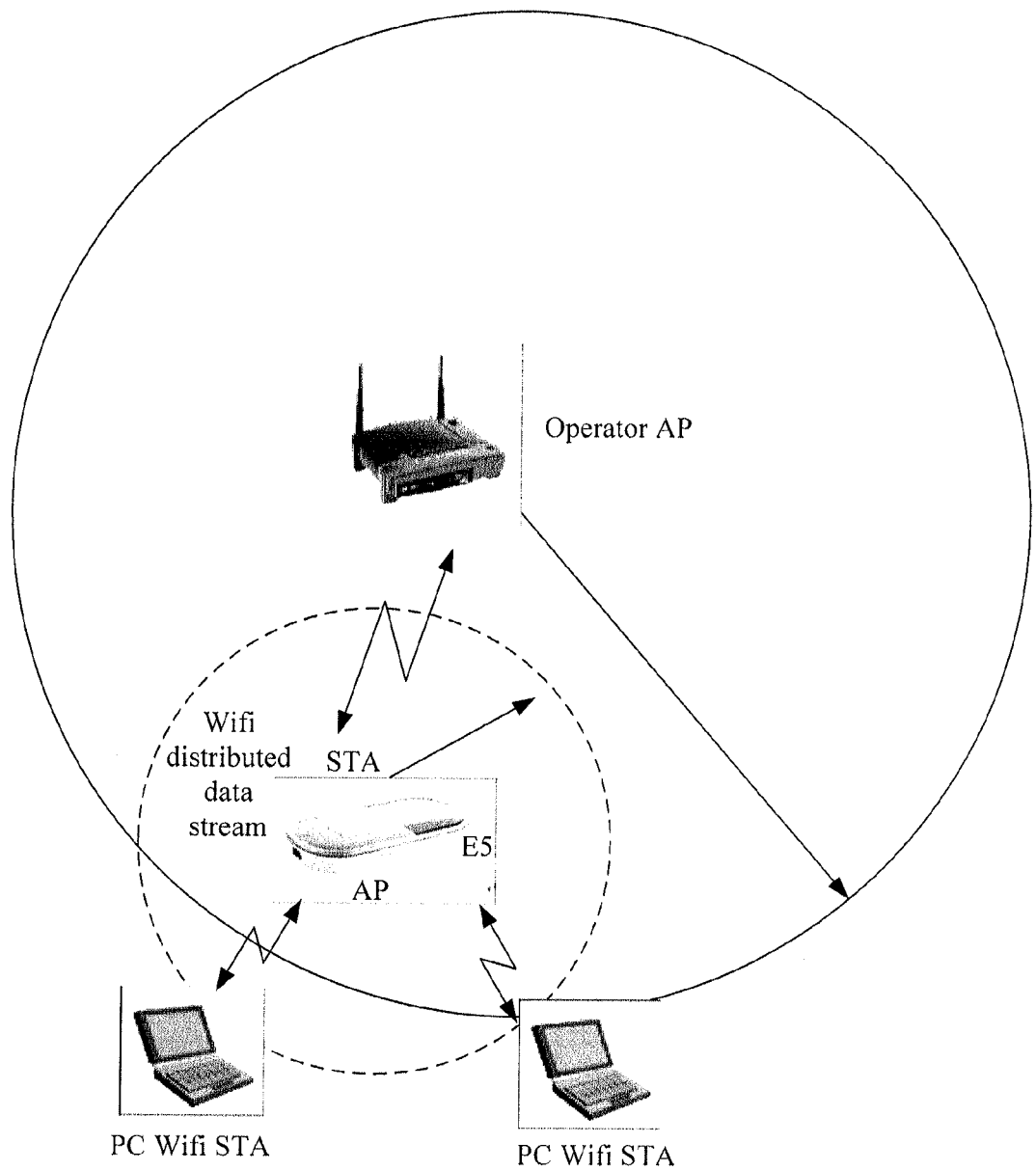
FIG. 2 is a schematic diagram of traffic distribution of the mobile wifi device according to the present invention.

Referring to FIG. 2, in scenario III, data traffic can be distributed to the wifi network, after the data traffic is distributed to the wifi network, the E5 may first serve as a wifi AP to receive data of an external PC, and then serve as a wifi STA to send the data to an operator AP; likewise, the data from the operator AP may also be sent to the PC by using the E5. In this case, the 2G/3G/4G port of the E5 does not need to work, thereby reducing bandwidth pressure for an operator data network.

The above E5 may implement the data traffic distribution by adopting the following embodiments.

Figure 3:
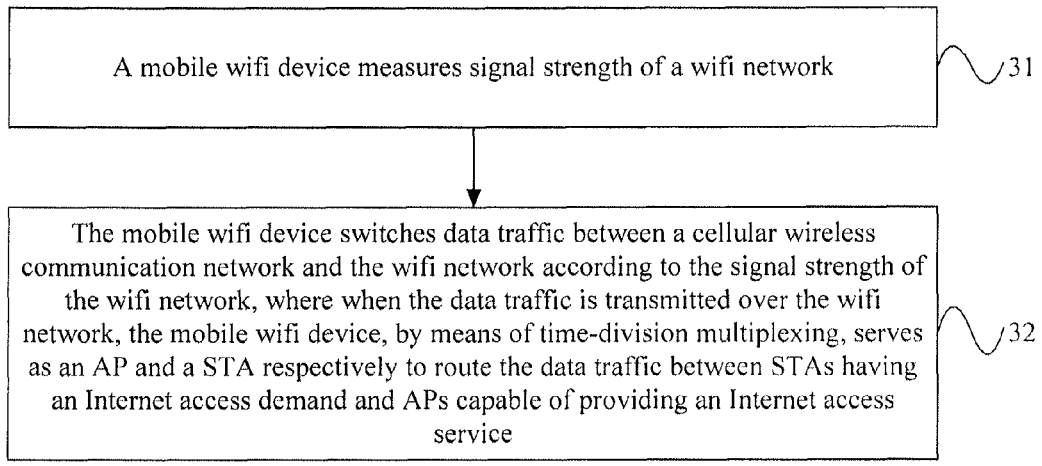
FIG. 3 is a schematic flowchart of a method for data traffic distribution according to an embodiment of the present invention.

FIG. 3 is a schematic flowchart of a method for data traffic distribution according to an embodiment of the present invention, including:

Step 31: A mobile wifi device measures signal strength of a wifi network.

The mobile wifi device is a device capable of providing traffic distribution for external APs and external STAs, for example, the above E5. The E5 may measure the signal strength of the wifi network periodically when performing a 2G/3G/4G data service; or, the E5 may also measure the signal strength of the wifi network when performing a wifi data service. The data service generally refers to audio, text, streaming media, and other services.

The external AP in the embodiment of the present invention refers to an AP other than the E5, namely, an AP capable of providing Internet access, for example an operator AP, an AP set at home, an AP set in Starbucks, or the like, so as to provide access for the E5; the external STA refers to an STA other than the E5, namely, an STA having the Internet access demand, for example, an ipad (tablet computer), a PC (personal computer), or the like, which can access the E5 device.

Step 32: The mobile wifi device switches data traffic between a cellular wireless communication network and the wifi network according to the signal strength of the wifi network, where, when the data traffic is transmitted over the wifi network, the mobile wifi device, by means of time division multiplexing, serves as the AP and the STA respectively to route the data traffic between the STAs having the Internet access demand and the APs capable of providing the Internet access service.

The 2G/3G/4G represents 2G, 3G, or 4G, the 2G, 3G, and 4G networks are all general cellular wireless communication networks, such as GSM (global system for mobile communications) or WCDMA (wideband code division multiple access) network, and this embodiment uses the 2G/3G/4G network as an example for illustration, but does not limit the specific form of the cellular communication network. The embodiment of the present invention uses the 3G network as an example.

For example, if the E5 finds that the signal strength of the wifi network is higher than a preset threshold when performing a 3G data service, the 3G network may be switched to the wifi network; or, if the E5 finds that the signal strength of the wifi network is lower than a preset threshold when performing a wifi data service, the wifi network may be switched to the 3G network.

This embodiment, by measuring the signal strength of the wifi network and switching between 3G and wifi according to the signal strength, implements traffic distribution of the data service at the WAN port. In addition, during the flow distribution, the present invention, by means of time division multiplexing, respectively serves as the AP and the STA to route the data traffic between the STAs with the Internet access demand and the APs capable of providing the Internet access service, thereby implementing data traffic distribution of a single chip.

Figure 4:
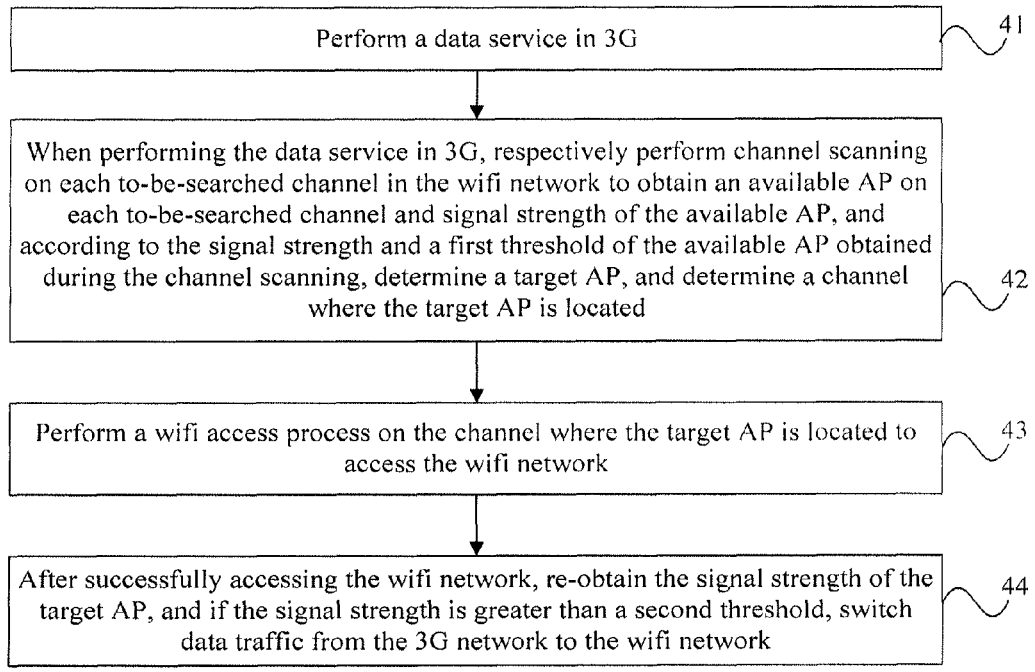
FIG. 4 is a schematic flowchart of a method for data traffic distribution according to another embodiment of the present invention.
Figure 5:
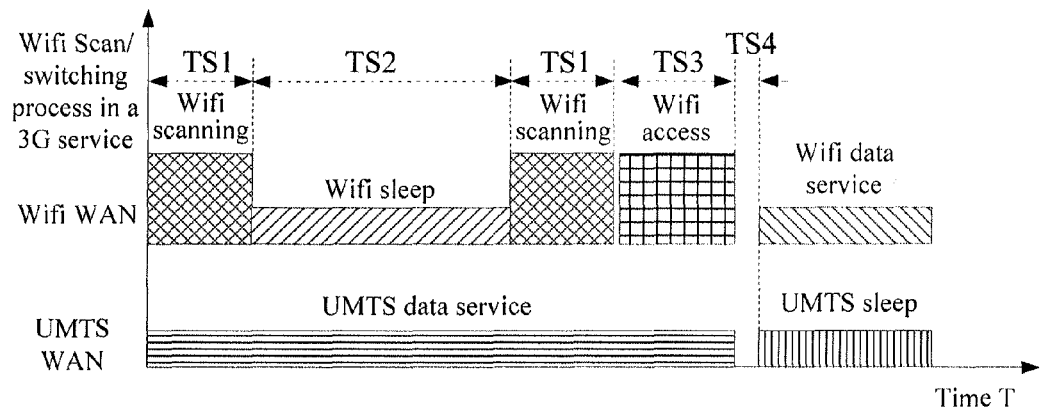
FIG. 5 is a schematic diagram of switching from 3G to wifi according to the present invention.

FIG. 4 is a schematic flowchart of a method for data traffic distribution according to another embodiment of the present invention, FIG. 5 is a schematic diagram of switching from 3G to wifi according to the present invention, and this embodiment uses the switching from 3G to wifi as an example. Referring to FIG. 4, the process of this embodiment includes:

Step 41: Perform a data service in 3G.

For example, referring to FIG. 5, in this embodiment, a case where 3G is a universal mobile telecommunications system (Universal Mobile Telecommunications System, UMTS) is taken as an example, and a UMTS data service is performed on a UMTS WAN port.

Step 42: When performing the data service in 3G, respectively perform channel scanning on each to-be-searched channel in the wifi network to obtain an available AP on each to-be-searched channel and the signal strength of the available AP, and according to the signal strength and a first threshold of the available AP obtained during the channel scanning, determine a target AP, and determine a channel where the target AP is located.

For example, referring to FIG. 5, a set of channel scanning (wifiscan) is performed at an interval of TS2, and TS2 may be 3 minutes. The wifi network is in a wifi sleep state (wifi sleep) in the interval between two sets of wifiscan. By periodical scanning, the target AP and the channel where the AP is located can be obtained. The specific scanning process can be known by referring to the subsequent FIG. 6 and FIG. 7. Referring to FIG. 5, the time required for scanning may be represented as TS1.

Step 43: Perform a wifi access (wifi access) process on the channel where the target AP is located so as to access the wifi network.

Figure 8:
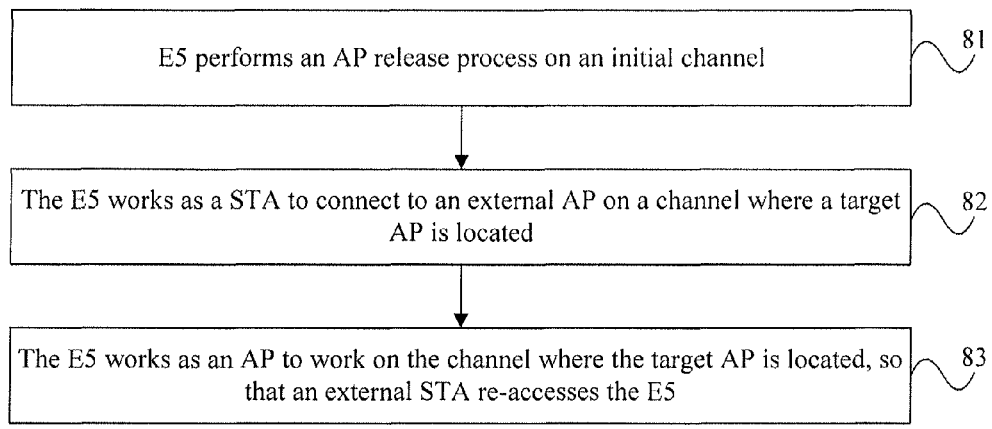
FIG. 8 is a schematic flowchart of wifi access according to an embodiment of the present invention.

Specific wifi access process can be known by referring to the subsequent FIG. 8.

Referring to FIG. 5, the time required for the wifi access process may be represented as TS3.

Step 44: After accessing wifi successfully, re-obtain the signal strength of the target AP, and if the signal strength is greater than a second threshold, switch data traffic from the 3G network to the wifi network.

After the data traffic is switched from the 3G network to the wifi network, a 3G connection may be released, and the release of the 3G connection may include deactivating a packet data protocol (Packet Data Protocol, PDP) to release an IP address in the 3G network.

Referring to FIG. 5, the time for switching the data traffic from the 3G network to the wifi network may be represented as TS4.

The first threshold and the second threshold can both be set, and for example, the second threshold may be 5-10 dBm smaller than the first threshold.

After successfully accessing the wifi network, the E5 may obtain the IP address in the wifi network, then change a route table, and adopt the IP address to perform the wifi data service in the wifi network.

After the switching, the data service is performed in the wifi network, and the 3G network is in a sleep state.

Figure 6:
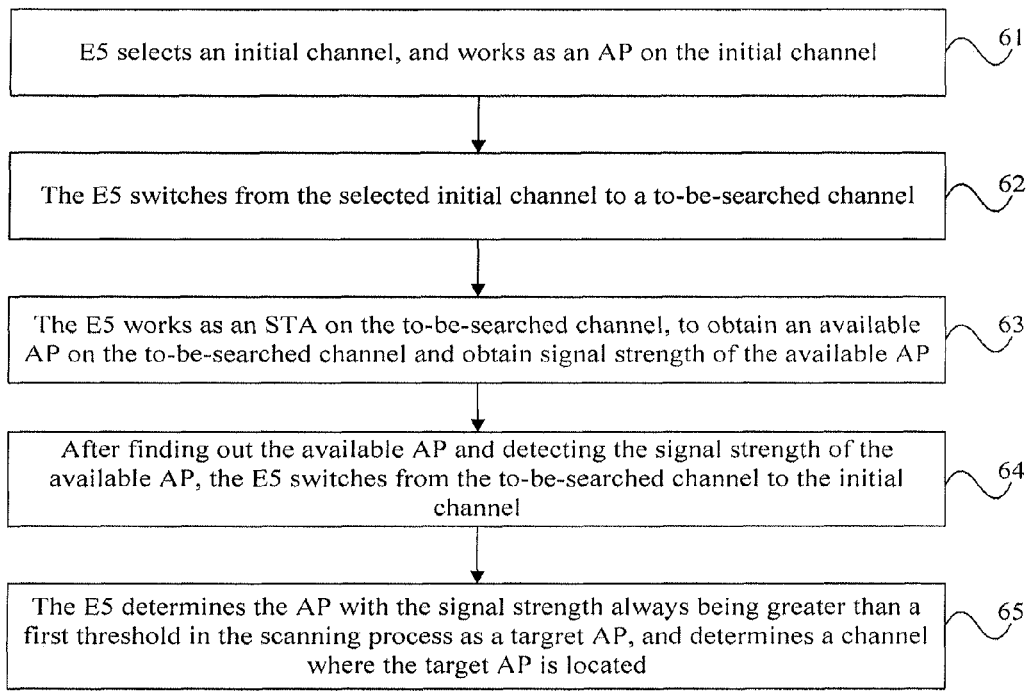
FIG. 6 is a schematic flowchart of wifi scanning according to an embodiment of the present invention.
Figure 7:
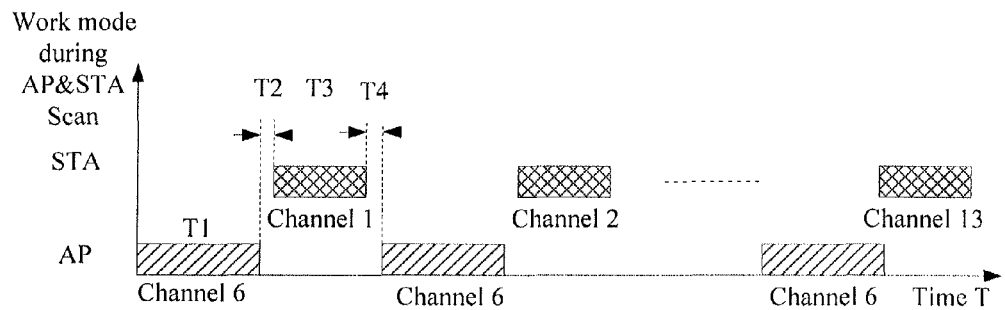
FIG. 7 is a schematic flowchart of wifi scanning according to an embodiment of the present invention.

FIG. 6 is a schematic flowchart of wifi scanning according to an embodiment of the present invention. In the wifi scanning process, the E5 respectively works as an AP and an STA in a time division multiplexing manner. FIG. 7 is a schematic diagram of a time division mode of working as the STA and the AP respectively according to the embodiment of the present invention. When working as the STA, the mobile wifi device accesses other nodes, for example, an operator network, and transmits data or signals with the AP in the operator network; and when working as the AP, the mobile wifi device transmits data or signals with other devices, such as an ipad or a PC.

The wifi network is composed of 13 channels (channel), which are respectively represented as channel 1 to channel 13. The scanning process may be a full frequency band search, or a target frequency point search. The full frequency band search refers to scanning the channels from channel 1 to channel 13 one by one, and searching the available AP on each channel. The target frequency point search refers to only searching a preset channel, for example, if 3 channels in the above 13 channels do not overlap each other, only these channels which do not overlap each other are searched, for example, channel 1, channel 6, and channel 11 are searched. This embodiment uses the full frequency band search as an example. The full frequency band search may be implemented in AP and STA time division modes, and referring to FIG. 6 and FIG. 7, the full frequency band search procedure may include:

Step 61: The E5 selects an initial channel, and works as the AP on the initial channel. For example, referring to FIG. 7, the selected initial channel is channel 6, and the E5 works as the AP on channel 6 for a certain period of time T1.

Referring to the schematic diagram shown in FIG. 2, when working as the AP, the E5 may receive data from the PC, or send the data received from the operator AP to the PC.

Step 62: The E5 switches from the selected initial channel to the to-be-searched channel.

The to-be-searched channel refers to each channel in a set of channels to be searched, this embodiment uses the full frequency band search as an example, and the to-be-searched channel includes channel 1 to channel 13. The switching to channel 1 is used as an example, and the processing flow of the other channels can be executed in the similar way.

Referring to FIG. 7, assuming that the switch time is T2, after a period of time T2, the device switches from channel 6 to channel 1, and the work state switches from the AP to the STA.

Similarly, referring to the schematic diagram shown in FIG. 2, when working as the STA, the E5 may send the data received from the PC to the operator AP or receive the data sent by the operator AP.

Step 63: The E5 works as the STA on the to-be-searched channel, to obtain an available AP on the to-be-searched channel and obtain the signal strength of the available AP.

For example, referring to FIG. 7, the E5 works as the STA on channel 1 for a period of time T3.

In the period of time T3, the E5 searches the available AP on channel 1 and detects the signal strength thereof.

In the search process of T3, the E5 may search in a passive manner or search in an active manner.

When searching in the passive manner:

after arriving at a certain channel, the wifi STA receives the data on the channel, and if finding a Beacon (beacon) frame (broadcast packet) broadcast by a certain AP, performs demodulating and decoding processes. Then, according to the received Beacon data, a signal-to-noise ratio of the received Beacon data is calculated, and the data such as the signal strength is received. An ordinary AP may send a Beacon broadcast packet at each 100 ms (configurable or longer). The Beacon frame may include a BSSID of the AP, and when searching as the STA on a certain channel (channel), the E5 determines the AP corresponding to the BSSID included in the received Beacon frame as the available AP, and takes the signal strength of the received beacon frame as the signal strength of the available AP.

When searching in the active manner:

after arriving at a certain channel, the wifi STA actively sends a Probe Request broadcast data packet, and according to the wifi protocol requirement, all of the APs receiving the Probe Request immediately feed back a Probe Response data packet and notify relevant configuration information about the AP, in the data packet, to the STA. In this way, the STA knows whether the available AP exists on the channel, and can calculate the data such as the signal-to-noise ratio of the received Probe Response data packet and receiving signal strength according to the received Probe Response data packet. At this time, when searching as the STA on a certain channel (channel), the E5 takes the AP corresponding to a basic service set identifier (Basic service set identifier, BSSID) included in the received Probe Response data packet as the available AP, and takes the signal strength of the received Probe Response data packet as the signal strength of the available AP.

As compared with the passive manner, the AP in the active manner has a higher AP reacting speed.

Step 64: After finding the available AP and detecting the signal strength of the available AP, the E5 switches from the to-be-searched channel to the initial channel.

For example, referring to FIG. 7, the E5 switches from channel 1 back to channel 6, and switched from the STA work state back to the AP work state. Assume that the switch time is T4.

Afterwards, the E5 may be switched from channel 6 to channel 2 again for searching, and the rest may be deduced by analogy until the searching is performed to last channel 13.

In addition, in order to enhance reliability, the above full frequency band search may be performed repeatedly for several times, that is, channel scanning is performed on channel 1 to channel 13 for a preset number of times, each time the channel scanning is performed, the E5 firstly works as the AP on the initial channel for the period of time T1, and switches to work as the STA on the to-be-searched channel for the period of time T3, and then switches back to the initial channel; afterwards, the E5 works as the AP on the initial channel again for the period of time T1, and switches to work as the STA on another to-be-searched channel for the period of time T3, and then switches back to the initial channel . . . .

Assuming that the number of repeating times is N1, the scanning time TS1=13×(T1+T2+T3+T4)×N1, where the T1+T2+T3+T4 is usually 100 ms, and N1 is 2.

Step 65: The E5 determines the AP with the signal strength always being greater than the first threshold in the scanning process as the target AP, and determines the channel where the target AP is located.

By the above search, the signal strength of each available AP on each channel can be determined, if the above channel scanning is performed for N1 times, and one or more available APs have the signal strength greater than the first threshold each time the channel scanning is performed, this or these available APs may be determined as the target AP. Meanwhile, because the channel where each available AP is located can be determined during the search, the channel where the target AP is located can also be determined.

Optionally, if the number of available APs with the signal strength greater than the first threshold is larger than 1, the AP with the highest priority can be determined as the target AP according to a priority corresponding to each AP.

Specifically, a configuration file (Profile) may be configured. The profile may be configured in factory by default or configured by the user as demanded. The configuration file records information of each AP, such as an SSID name, a password, a priority, and a possible encryption manner. During the search, when it is found that the number of APs higher than the first threshold is larger than 1, the AP with the highest priority is selected as the target AP according to priority information in the profile. The priority is used to indicate a selection sequence of the APs, and a higher priority indicates that the corresponding AP is selected with a higher priority.

This embodiment uses determining the AP with the signal strength always being greater than the first threshold each time the channel scanning is performed as the target AP as an example. Optionally, other manners can also be adopted, for example, weighed averaging is performed on the signal strength obtained each time the channel scanning is performed, and the AP with the weighed average value of the signal strength greater than the first threshold as the target AP. A calculation formula of performing weighed averaging on N numbers: $D_i$, i=0, 1 ... N−1 may be $$\overline{D} = \sum_{i=0}^{N-1} a_i D_i,$$

where $\overline{D}$ is a weighed average value, $a_i$ is a set weighting coefficient, $a_i \geq 0$, and $$\sum_{i=0}^{N-1} a_i = 1.$$

This embodiment uses performing the channel scanning for many times as an example for illustration, for example performing a preset number of times of scanning. Assuredly, each channel can also be scanned once, and at this time, it is unnecessary to perform the weighed averaging calculation.

After the above search, the target AP can be determined. For example, the available AP obtained by searching on channel 1 is AP1, the signal strength of the AP1 is greater than the first threshold in the repeated two scanning processes, or the weighted average value of the signal strength values obtained by the two scanning processes of the AP1 is greater than the first threshold, so that the AP1 is the target AP, and the channel where the target AP is located is channel 1.

The first threshold may be determined according to a working mode of a mobile device, and the calculation formula of the first threshold may be represented as: L1=Y−P1+P2, where L1 is the first threshold, Y is a receiver sensitivity required by the E5 working as the AP and the STA, P1 is a transmitting power of the E5, and P2 is a transmitting power of the operator AP. When the E5 is in different working modes, P1 has different values. For example, if the E5 works by using a battery, P1=3 dBm; and if the E5 works by using a charger, namely, works under an external power supply, P1=13 dBm.

The P2 and Y can be obtained according to an existing protocol, for example, the P2 is usually between 17.78 dBm and 20 dBm, and the Y may be obtained according to a receiver sensitivity data table specified in IEEE802.11 Assuming that P2=20 dBm and Y=−75 dBm, if the E5 uses the battery, L1=−58 dBm, and if E5 uses the charger, L1=−68 dBm; for another example, assuming that P2=17.78 dBm and Y=−75 dBm, if the E5 uses the battery, L1=−60.22 dBm, and if the E5 uses the charger, L1=−70.22 dBm.

The first threshold and the second threshold may be set, for example, the first threshold may be −65 dBm, and the second threshold may be −70 dBm.

Figure 9:
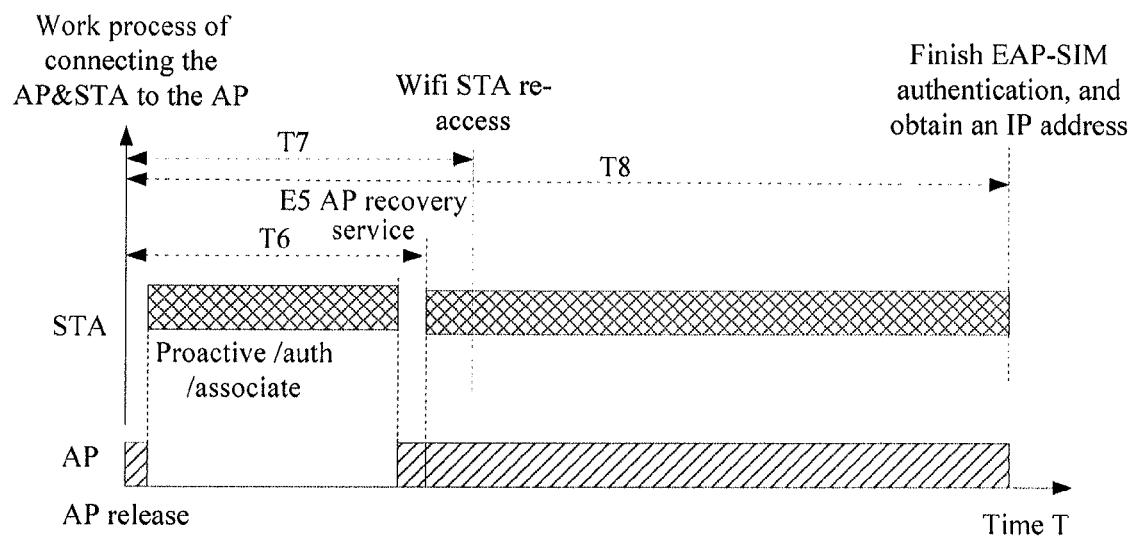
FIG. 9 is a schematic diagram of a wifi access time sequence according to an embodiment of the present invention.

FIG. 8 is a schematic flowchart of wifi access according to the embodiment of the present invention; and FIG. 9 is a schematic diagram of a wifi access time sequence according to the embodiment of the present invention.

Referring to FIG. 8 and FIG. 9, the wifi access process may include:

Step 81: The E5 performs an AP release process on the initial channel.

Since the E5 implements the traffic distribution function by using a single chip, the STA and the AP are required to work on the same channel. For example, the E5 initially works as the AP on channel 6, and the scanning determines that the channel where the target AP is located is channel 1, and the AP needs to be switched from channel 6 to channel 1. For example, referring to FIG. 9, the AP release process is performed at this time, for example, channel 6 is released.

Step 82: The E5 works as the STA to connect to an external AP on the channel where the target AP is located.

The external AP for example is the operator AP. It is assumed that the switching-targeted channel is channel 1.

In this case, referring to FIG. 9, the E5 and the operator AP may perform the processes including activation, authentication, and authorization (proactive, auth, and associate) on channel 1.

Step 83: The E5 works as the AP to work on the channel where the target AP is located, so that the external STA re-accesses the E5.

For example, referring to FIG. 9, the E5 may send a beacon frame on channel 1.

Referring to FIG. 9, after a period of time T6, the E5 may work as the STA to access the operator AP, and T6 is about 3.5 s; and after a period of time T7, the external STA, for example a PC, may access the E5, and T7 is about 5 s.

In addition, the E5 may work as the STA and the AP respectively to implement corresponding authentication and obtain an IP address in the wifi network, and as shown in FIG. 9, the time is T8.

Figure 10:
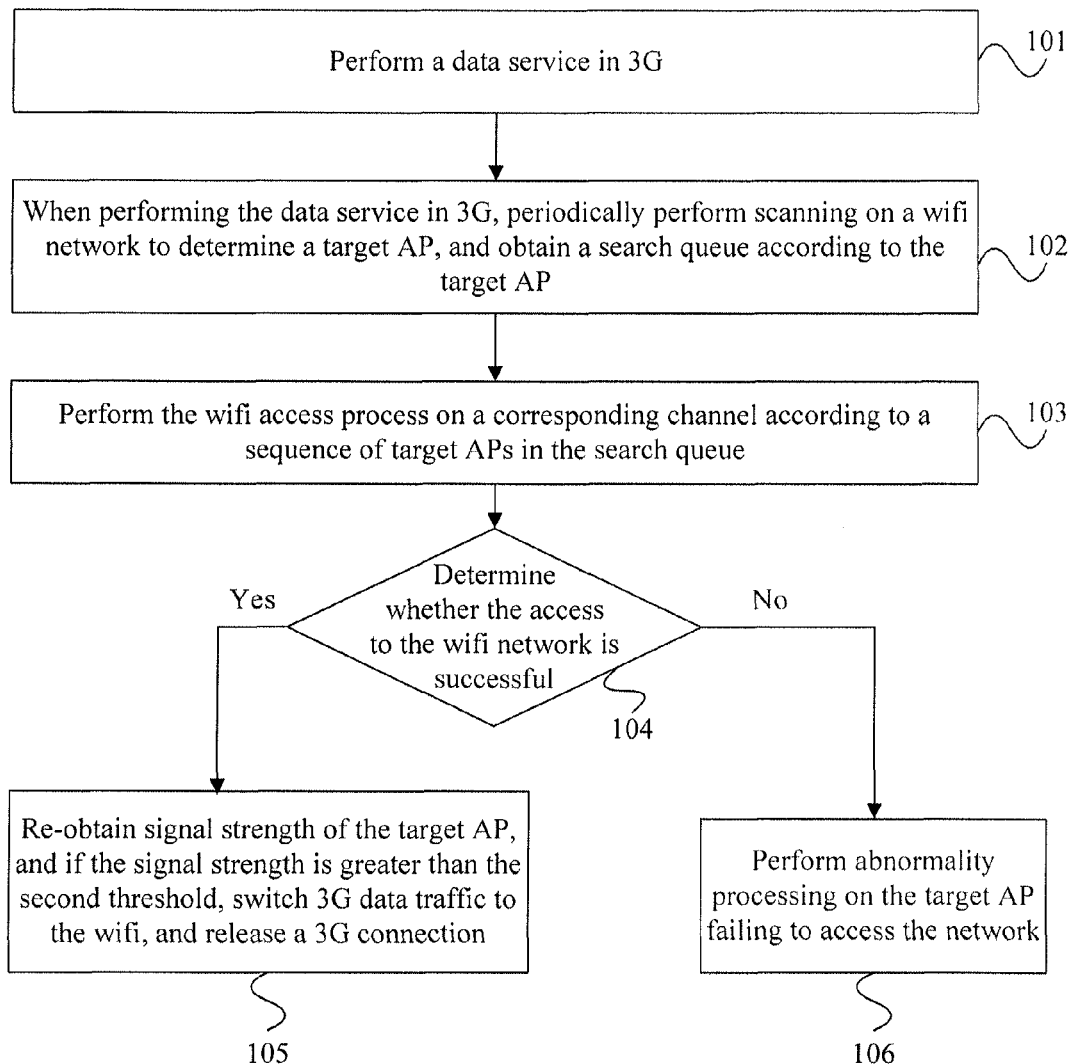
FIG. 10 is a schematic flowchart of a method for data traffic distribution according to another embodiment of the present invention.

FIG. 10 is a schematic flowchart of the method for data traffic distribution according to another embodiment of the present invention, including:

Step 101: Perform a data service in 3G.

Step 102: When performing the data service in 3G, periodically perform scanning on the wifi network to determine the target AP, and obtain a search queue according to the target AP.

More than one target AP may be provided, and if more than one switching-targeted AP is provided, the search queue may be composed by sequentially arranging the signal strength values according to the values thereof. In addition, during the scanning, the channel where the target AP is located is also determined.

The search queue in this embodiment refers to an arrangement sequence of multiple APs with the same priority. For example, the APs all belong to China Unicorn, and the access sequence of the APs of China Unicom is represented by the search queue. The BSSIDs of these APs may be recorded in the search queue.

Step 103: Perform the wifi access process on a corresponding channel according to a sequence of target APs in the search queue. The wifi access process is performed to access the wifi network.

For example, according to a sequence from beginning to end, it is firstly attempted that the wifi access is performed on the channel where the target AP in the first place is located.

Step 104: Determine whether the access to the wifi network is successful, and if the access is successful, perform step 105, and otherwise, perform step 106.

The wifi access may be attempted several times, for example, if the wifi access attempts reach three times, and all the three attempts have failed, it indicates that the wifi access fails.

Step 105: After successfully accessing the wifi network, re-obtain the signal strength of the target AP, and if the signal strength is greater than the second threshold, switch the 3G data traffic to the wifi, and release the 3G connection, for example, deactivate the 3G PDP, and release the IP address in the 3G network.

Step 106: Perform abnormality processing on the target AP failing to access the wifi network.

The abnormality processing may include:

Manner I: Mark the corresponding AP as an abnormal event, and no longer initiate the connection to the AP before restarting the mobile wifi device. After the restarting, namely after next powering-on, the connection to the AP may be initiated again.

Manner II: Before restarting the mobile wifi device, place the BSSID of the AP at the tail of the search queue to delay initiating the access to the first AP, where the first AP may be any AP in the target APs. After the restarting, the BSSID of the AP is maintained at the tail, or the BSSID is recovered to be placed at a default position before being placed at the tail.

Manner III: Within a preset time before restarting the mobile wifi device, for example, 10 minutes, maintain the BSSID of the AP in an invalid state. Within the duration when the BSSID is invalid, the connection to the AP corresponding to the BSSID is no longer initiated. After the restarting, the valid state of the BSSID may be recovered, that is, the connection to the AP is recovered after the restarting.

Figure 11:
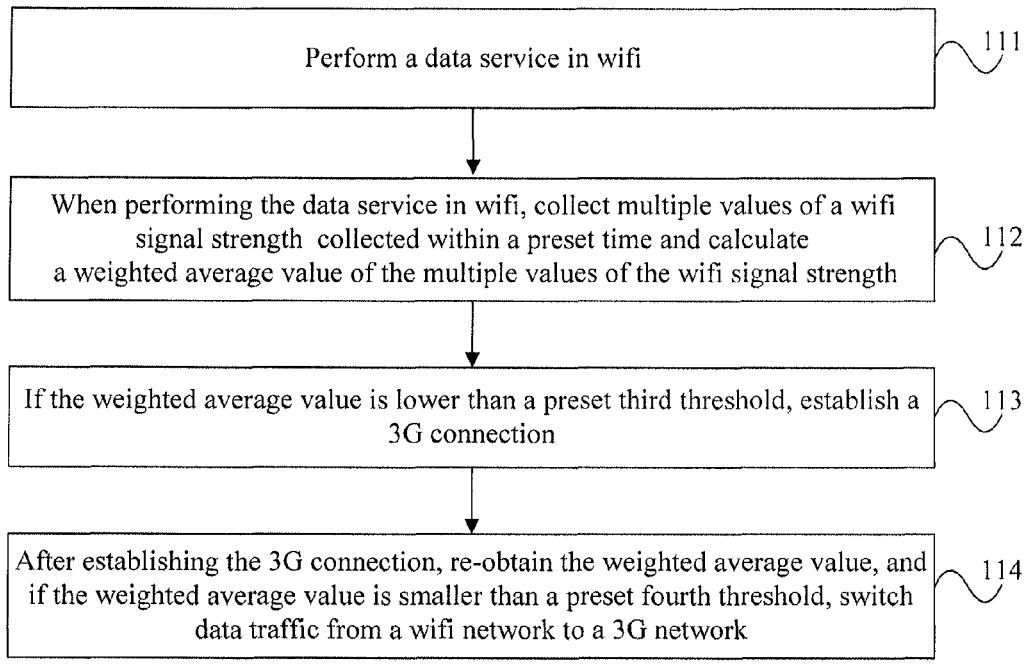
FIG. 11 is a schematic flowchart of a method for data traffic distribution according to another embodiment of the present invention.
Figure 12:
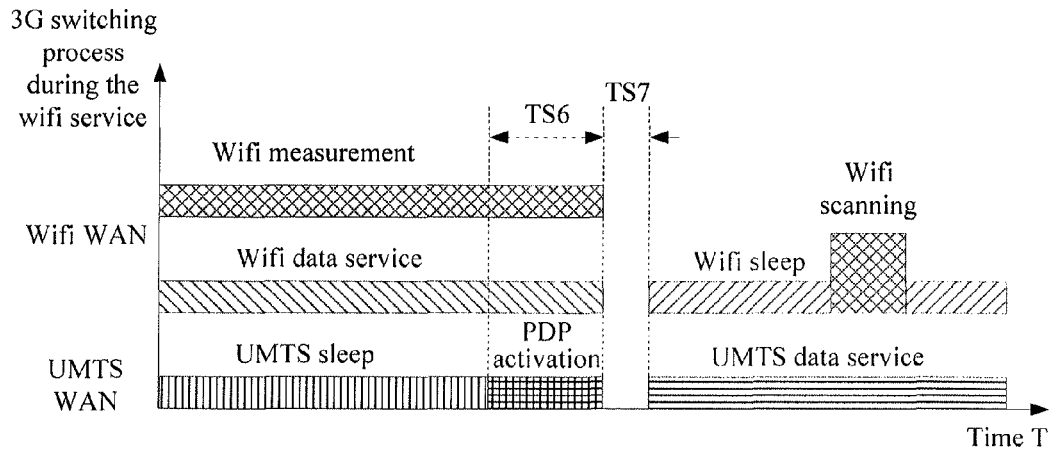
FIG. 12 is a schematic diagram of switching from wifi to 3G according to the present invention.

FIG. 11 is a schematic flowchart of a method for data traffic distribution according to another embodiment of the present invention, FIG. 12 is a schematic diagram of switching from wifi to 3G according to the present invention, and this embodiment uses the switching from wifi to 3G as an example. Referring to FIG. 11, the process of this embodiment includes:

Step 111: Perform a data service in wifi.

Step 112: When performing the data service in wifi, collect multiple values of a wifi signal strength collected within a preset time and calculate a weighted average value of the multiple values of the wifi signal strength.

For example, the wifi signal strength is collected at 1-second intervals, and the weighted average value is calculated at 10-second intervals. It can be understood that, the collection interval is not limited to the above and is configurable.

Step 113: If the weighted average value is lower than a preset third threshold, establish a 3G connection, for example, activate a 3G PDP, and obtain an IP address in 3G.

The third threshold may have a value of −75 dBm.

Step 114: After establishing the 3G connection, re-obtain the weighted average value, and if the weighted average value is smaller than a preset fourth threshold, switch the data traffic from the wifi network to the 3G network.

The fourth threshold may have a value of −70 dBm.

Figure 13:
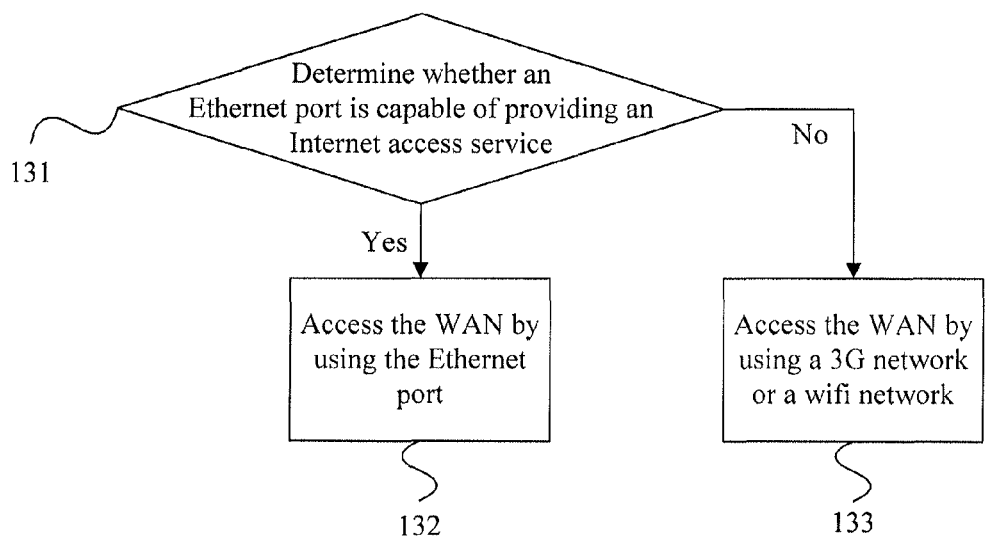
FIG. 13 is a schematic flowchart of the method for traffic distribution according to another embodiment of the present invention.

FIG. 13 is a schematic flowchart of a method for data traffic distribution according to another embodiment of the present invention, including:

Step 131: Determine whether an Ethernet port is capable of providing an Internet access service, if the Ethernet port is capable of providing an Internet access service, perform step 132, and otherwise, perform step 133.

The Internet (Internet) access service that can be provided for example includes accessing web pages, pinging websites, and the like.

For example, a TCP/IP or UDP/IP access may be initiated at the Ethernet port to determine whether the Ethernet port is capable of providing a WAN service, for example by means of pinging, and if a ping response is successfully received, it indicates that the Ethernet port is capable of providing Internet access.

Step 132: Access the WAN by using the Ethernet port.

That is, when an effective wired connection exists, the wired connection is adopted to access the WAN.

Step 133: Access the WAN by using the 3G network or the wifi network.

The flow thereof can be known by referring to above each embodiment.

This embodiment discloses accessing by using a wired manner in priority, which can enhance the accessing stability.

Figure 14:
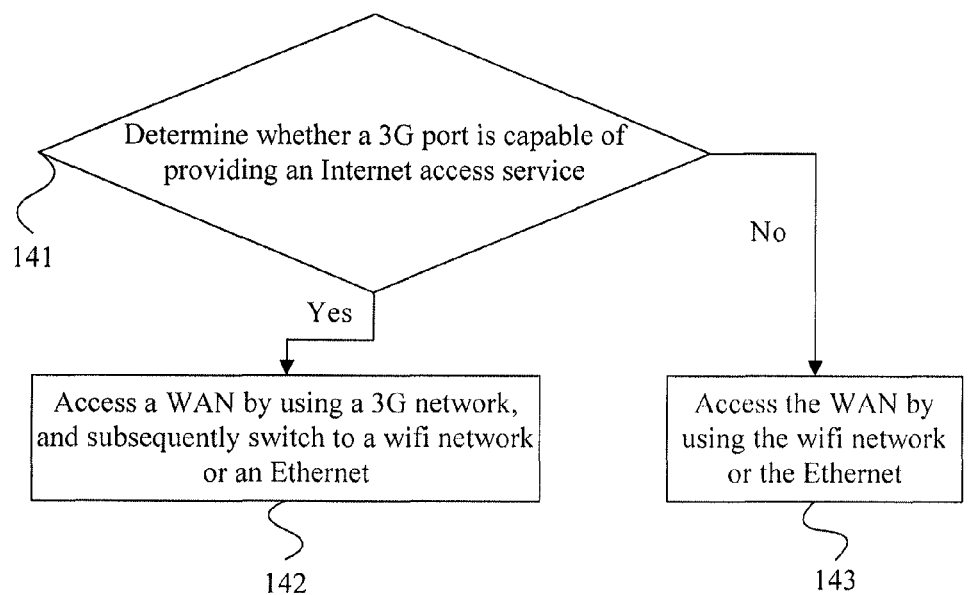
FIG. 14 is a schematic flowchart of a method for data traffic distribution according to another embodiment of the present invention.

FIG. 14 is a schematic flowchart of a method for data traffic distribution according to another embodiment of the present invention, including:

Step 141: Determine whether the 3G port is capable of providing an Internet access service, if the 3G port is capable of providing an Internet access service, perform step 142, and otherwise, perform Step 143.

For example, a TCP/IP or UDP/IP access may be initiated at the 3G port to determine whether the Ethernet port is capable of providing a WAN service, for example by means of pinging, and if a ping response is successfully received, it indicates that the Ethernet port is capable of providing the Internet access service.

Step 142: Access the WAN by using the 3G network, and subsequently switch to the wifi network or the Ethernet.

For example, when the 3G network is used to access the WAN, it is switched to the wifi network when determining to be capable of being switched to the wifi network according to the above embodiment, or switched to the Ethernet when finding a wired connection.

Step 143: Access the WAN by using the wifi network or the Ethernet.

For example, if the wifi STA port is capable of providing the Internet access service, the wifi network is used to access the WAN, or when the Ethernet port is capable of providing the Internet access service, the Ethernet is used to access the WAN.

In addition, after the 3G network or the wifi network is used to access the WAN, the signal strength of the wifi network may be measured.

This embodiment adopts the 3G manner to access in priority, and since the 3G has a high connection speed, fast access of the WAN can be implemented.

Figure 15:
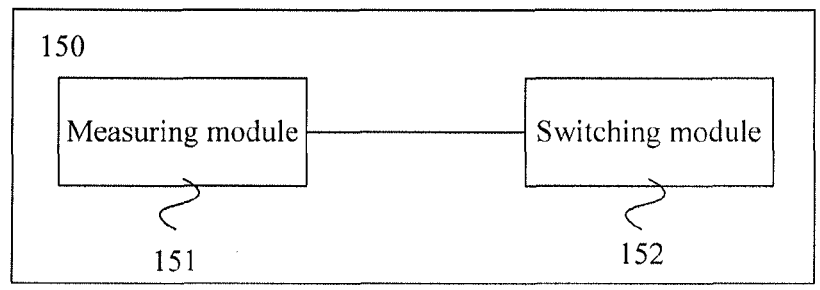
FIG. 15 is a schematic structural diagram of a device for data traffic distribution according to an embodiment of the present invention.

FIG. 15 is a schematic structural diagram of a device for data traffic distribution according to an embodiment of the present invention. The device 150 includes a measuring module 151 and a switching module 152; the measuring module 151 is configured to measure signal strength of a wireless interconnection wifi network, and send the signal strength of the wifi network to the switching module; the switching module 152 is configured to receive the signal strength of the wifi network sent by the measuring module, and switch data traffic between a cellular wireless communication network and the wifi network according to the signal strength of the wifi network, where, when the data traffic is transmitted over the wifi network, the mobile wifi device, by means of time division multiplexing, serves as an AP and an STA to route the data traffic between STAs having an Internet access demand and APs capable of providing an Internet access service.

Figure 16:
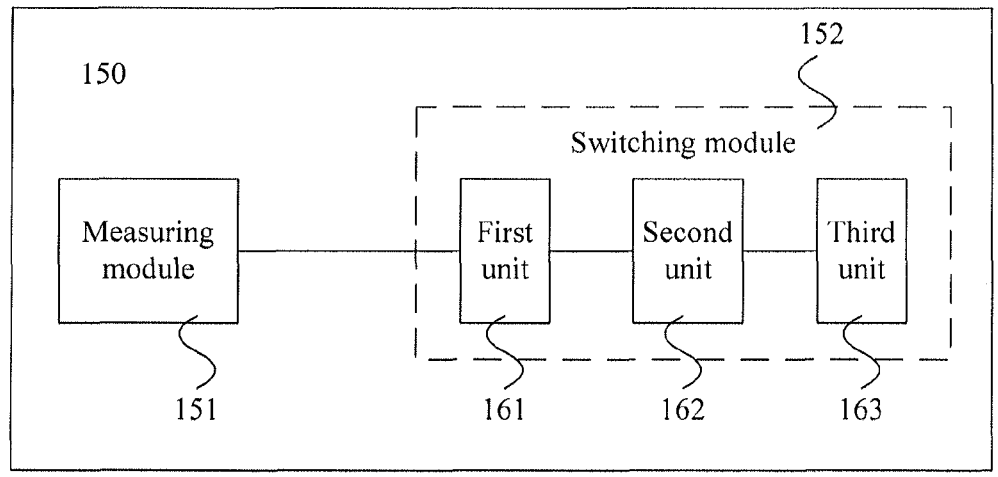
FIG. 16 is a schematic structural diagram of a device for data traffic distribution according to another embodiment of the present invention.

Optionally, the measuring module is specifically configured to: when performing a cellular wireless communication data service, respectively perform channel scanning on each to-be-searched channel of at least one to-be-searched channel in the wifi network, to obtain an available AP from the APs capable of providing the Internet access service on each to-be-searched channel and the signal strength of the available AP; and referring to FIG. 16, the switching module includes:

a first unit 161, configured to determine the AP with signal strength greater than a preset first threshold or a weighted average value of multiple values of the signal strength greater than the first threshold as a target AP;

a second unit 162, configured to perform a wifi access process on the channel where the target AP determined by the first unit is located so as to access the wifi network; and a third unit 163, configured to: after the second unit accesses the wifi network successfully, re-obtain the signal strength of the target AP, and if the re-obtained signal strength is greater than a preset second threshold, switch the data traffic from the cellular wireless communication network to the wifi network.

Optionally, the measuring module is specifically configured to: when performing the cellular wireless communication data service, respectively perform a preset number of times of channel scanning on each to-be-searched channel in the wifi network, where each time the channel scanning is performed, the available AP on each to-be-searched channel and the signal strength of the available AP are obtained.

Optionally, when there is more than one available AP with the signal strength greater than the first threshold, or when there is more than one available AP with the weighted average value of multiple values of the signal strength greater than the first threshold, the target AP determined by the first unit is an AP with the highest priority in the more than one AP, and the priority is determined by a pre-configured parameter indicating an AP selection sequence.

Optionally, the measuring module is specifically configured to:

when performing the cellular wireless communication data service, respectively perform a preset number of times of channel scanning on each to-be-searched channel in the wifi network, where the obtaining the available AP on each to-be-searched channel and the signal strength of the available AP each time the channel scanning is performed includes:

when reaching a preset time, select an initial channel, and work during a first time as the AP on the initial channel;

after working during the first time, switch to one to-be-searched channel;

work during a second time as the STA on the one to-be-searched channel, and detect the available AP on the one to-be-searched channel and the signal strength of the available AP on the one to-be-searched channel;

after working during the second time, switch back to the initial channel;

after working during the first time as the AP again on the initial channel, switch to work during the second time as the STA on another to-be-searched channel, detect the available AP on the another to-be-searched channel and the signal strength of the available AP on the another to-be-searched channel, and switch back to the initial channel after working during the second time; and repeat the above process until all the to-be-searched channels of the at least one to-be-searched channel are detected.

Optionally, the second module is specifically configured to:

perform an AP release process on the initial channel;

connect, as the STA, to the target AP on the channel where the target AP is located; and after connecting to the target AP as the STA, work as the AP on the channel where the target AP is located, so that the STAs having the access demand re-access the mobile wifi device.

Optionally, the target AP includes a first AP, and the first AP refers to an AP of the mobile wifi device failing to access for a preset number of times, and the device further includes:

a processing module, configured to: no longer initiate an access to the first AP before restarting; or before restarting, place a basic service set identifier BSSID of the first AP at the tail of a search queue to delay initiating the access to the first AP; or within a preset time before restarting, maintain a state of the BSSID of the first AP as an invalid state so as to no longer initiate the access to the first AP within the preset time.

Optionally, a calculation formula of the first threshold adopted by the first unit is: $L1=Y-P1+P2$, where L1 is the first threshold, Y is a receiver sensitivity required by the mobile will device working as the AP and the STA, P1 is a transmitting power of the mobile wifi device, and P2 is a transmitting power of the target AP.

Optionally, when the device works in a battery mode and works in a charger mode, P1 has different values.

Optionally, the measuring module is specifically configured to: when performing a wifi data service, collect multiple values of a wifi signal strength collected within a preset time and calculate a weighted average value of the multiple values of the wifi signal strength; and the switching module is specifically configured to: if the weighted average value is lower than a preset third threshold, establish a cellular wireless communication network connection; after establishing the cellular wireless communication network connection, re-obtain the weighted average value, and if the weighted average value is lower than a preset fourth threshold, switch the data traffic from the wifi network to the cellular wireless communication network.

Figure 17:
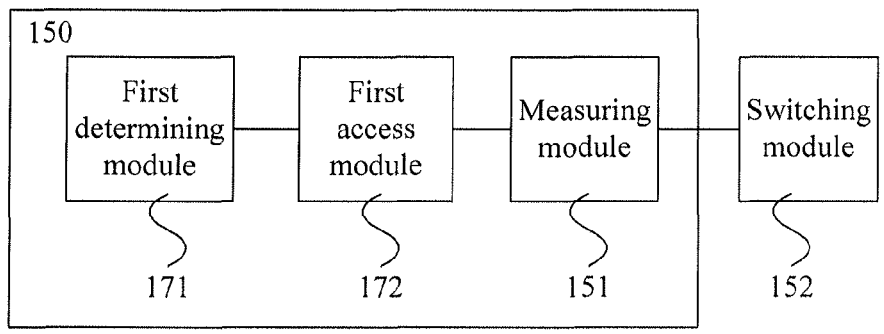
FIG. 17 is a schematic structural diagram of a device for data traffic distribution according to another embodiment of the present invention.

Optionally, referring to FIG. 17, the device further includes:

a first determining module 171, configured to determine whether an Ethernet port of wide area network WAN ports is capable of providing the Internet access service; and a first access module 172, configured to use, when the first determining module determines that the Ethernet port of the WAN ports is capable of providing the Internet access service, the Ethernet port to access a WAN.

Figure 18:
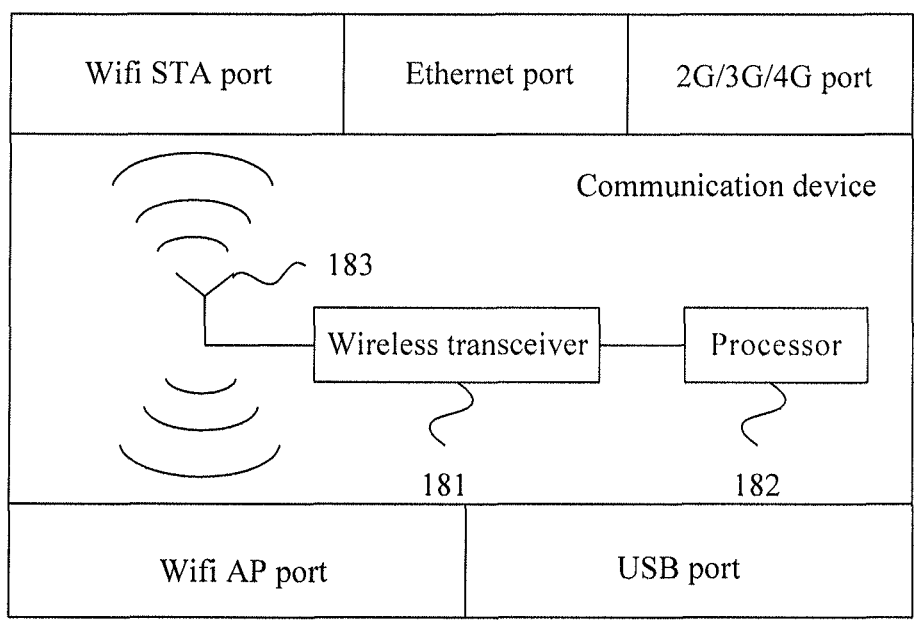
FIG. 18 is a schematic structural diagram of a communication device according to an embodiment of the present invention.

In addition, the present invention further provides an embodiment of a communication device as follows. As shown in FIG. 18, the communication device includes:

a wireless transceiver (transceiver), configured to measure signal strength of a wifi network; and a processor, configured to switch data traffic between a cellular wireless communication network and the wifi network according to the signal strength of the wifi network, where, when the data traffic is transmitted over the wifi network, the mobile wifi device, by means of time division multiplexing, serves as an AP and an STA respectively to route the data traffic between STAs having an Internet access demand and APs capable of providing an Internet access service.

The wireless transceiver is denoted by 181 in FIG. 18, the processor is denoted by 182 in FIG. 18, and the wireless transceiver may transmit and receive a wireless signal by using one or more antennas 183, to perform signal scanning and measurement. The one or more antennas 183 may receive a wifi signal by using a Wifi AP port or a Wifi STA port shown in FIG. 18.

The processor may be implemented by using a logical integrated circuit.

Optionally, the wireless transceiver is specifically configured to: when performing a cellular wireless communication data service, respectively perform channel scanning on each to-be-searched channel of at least one to-be-searched channel in the wifi network to obtain an available AP from the APs capable of providing the Internet access service on each to-be-searched channel and the signal strength of the available AP; and the processor is specifically configured to:

determine the available AP with signal strength greater than a preset first threshold or a weighted average value of multiple values of the signal strength greater than the first threshold as a target AP;

perform a wife access process on the channel where the target AP is located so as to access the wifi network; and after accessing the wifi network successfully, re-obtain the signal strength of the target AP, and if the re-obtained signal strength is greater than a preset second threshold, switch the data traffic from the cellular wireless communication network to the wifi network.

Optionally, the wireless transceiver is specifically configured to: respectively perform a preset number of times of channel scanning on each to-be-searched channel in the wife network, where each time the channel scanning is performed, the available AP on each to-be-searched channel and the signal strength of the available AP are obtained; and the processor is specifically configured to: when there is more than one available AP with the signal strength greater than the first threshold, or when there is more than one available AP with the weighted average value of multiple values of the signal strength greater than the first threshold, the target AP is an AP with the highest priority in the more than one AP, and the priority is determined by a pre-configured parameter indicating an AP selection sequence.

Optionally, the wireless transceiver is specifically configured to:

when the mobile wifi device reaches a preset time, select an initial channel, work during a first time as the AP on the initial channel; after working during the first time, switch to one to-be-searched channel; work during a second time as the STA on the one to-be-searched channel, and detect the available AP on the one to-be-searched channel and the signal strength of the available AP on the one to-be-searched channel; after working during the second time, switching back to the initial channel; after working during the first time as the AP again on the initial channel, switch to work during the second time as the STA on another to-be-searched channel, detect the available AP on the another to-be-searched channel and the signal strength of the available AP on the another to-be-searched channel, and switch back to the initial channel after working during the second time; and repeat the above process until all the to-be-searched channels of the at least one to-be-searched channel are detected.

Optionally, the processor is specifically configured to: perform an AP release process on the initial channel; connect, as the STA, to the target AP on the channel where the target AP is located; and after connecting to the target AP as the STA, work as the AP on the channel where the target AP is located, so that the STAs having the access demand re-access the mobile wifi device.

Optionally, the target AP includes a first AP, and the first AP refers to an AP of the mobile wifi device failing to access for a preset number of times, and the processor is further configured to: no longer initiate an access to the first AP before restarting; or before restarting, place a basic service set identifier BSSID of the first AP at the tail of a search queue to delay initiating the access to the first AP; or within a preset time before restarting, maintain a state of the BSSID of the first AP as an invalid state so as to no longer initiate the access to the first AP within the preset time.

Optionally, a calculation formula of the first threshold adopted by the processor is: $L1=Y-P1+P2$, where $L1$ is the first threshold, $Y$ is a receiver sensitivity required by the mobile wifi device working as the AP and the STA, $P1$ is a transmitting power of the mobile wifi device, and $P2$ is a transmitting power of the target AP.

Optionally, when the mobile wifi device works in a battery mode and works in a charger mode, $P1$ has different values.

Optionally, the wireless transceiver is specifically configured to: when performing a wifi data service, collect multiple values of a wifi signal strength collected within a preset time and calculate a weighted average value of the multiple values of the wifi signal strength; and the processor is specifically configured to: if the weighted average value is lower than a preset third threshold, establish a cellular wireless communication network connection; after establishing the cellular wireless communication network connection, re-obtain the weighted average value, and if the weighted average value is lower than a preset fourth threshold, switch the data traffic from the wifi network to the cellular wireless communication network.

Optionally, the processor is further configured to: determine whether an Ethernet port of wide area network WAN ports is capable of providing the Internet access service; and when the Ethernet port of the WAN ports is capable of providing the Internet access service, use the Ethernet port to access a WAN.

Optionally, the processor is further configured to: determine whether the cellular wireless communication port is capable of providing the Internet access service; and when the cellular wireless communication port is capable of providing the Internet access service, adopt the cellular wireless communication network to access the WAN to perform the cellular wireless communication data service.

Persons of ordinary skill in the art can understand: all or a part of steps in the above each method embodiment can be implemented by using program instruction related hardware. The above program may be stored in a computer readable storage medium. The above program may be stored in a computer readable storage medium. When the program is executed, the steps of the above each method embodiment are executed, and the above storage medium includes: various media capable of storing program codes such as a ROM, a RAM, a magnetic disk, or an optical disk.

Finally, it should be noted that: the above each embodiment is merely used to illustrate the technical solution of the present invention, but is not limited to the present invention. Although the present invention is illustrated in detail with reference to the above each embodiment, persons of ordinary skill in the art should understand: modifications can be made to the technical solution disclosed in the above each embodiment, or equivalent replacements can be made to a part of or all of the technical features thereof; and these modifications or replacements will not make the corresponding technical solution substantively depart from the scope of the technical solution of the embodiments of the present invention.

What is claimed is:

1. A method for data traffic distribution, comprising:
measuring, by a mobile wireless interconnection wifi device, signal strength of a wifi network, wherein the measuring the signal strength of the wifi network comprises: when performing a wifi data service, collecting multiple values of a wifi signal strength collected within a preset time and calculating a weighted average value of the multiple values of the wifi signal strength; and
switching, by the mobile wifi device, data traffic between a cellular wireless communication network and the wifi network according to the signal strength of the wifi network, wherein when the data traffic is transmitted over the wifi network, the mobile wifi device, by means of time division multiplexing, serves as an access point AP in a first time period and a station STA in a second time period respectively to route the data traffic between STAs having an Internet access demand and APs capable of providing an Internet access services, wherein switching the data traffic between the cellular wireless communication network and the wifi network according to the signal strength of the wifi network comprises:
if the weighted average value is lower than a preset third threshold, establishing a cellular wireless communication network connection; and
after establishing the cellular wireless communication network connection, re-obtaining the weighted average value, and if the weighted average value is lower than a preset fourth threshold, switching the data traffic from the wifi network into the cellular wireless communication network.

2. The method according to claim 1, wherein
the measuring signal strength of a wifi network comprises:
when performing a cellular wireless communication data service, respectively performing channel scanning on each to-be-searched channel of at least one to-be-searched channel in the wifi network, to obtain an available AP from the APs capable of providing the Internet access service on each to-be-searched channel and signal strength of the available AP; and
the switching data traffic between a cellular wireless communication network and the wifi network according to the signal strength of the wifi network comprises:
determining the available AP with signal strength greater than a preset first threshold or a weighted average value of multiple values of the signal strength greater than the first threshold as a target AP;
performing a wifi access process on the channel where the target AP is located so as to access the wifi network; and
after accessing the wifi network successfully, re-obtaining the signal strength of the target AP, and if the re-obtained signal strength is greater than a preset second threshold, switching the data traffic from the cellular wireless communication network to the wifi network.

3. The method according to claim 2, wherein the respectively performing channel scanning on each to-be-searched channel of at least one to-be-searched channel in the wifi network to obtain an available AP from the APs capable of providing the Internet access service on each to-be-searched channel and the signal strength of the available AP comprises:
respectively performing a preset number of times of channel scanning on each to-be-searched channel in the wifi network, wherein each time the channel scanning is performed, the available AP on each to-be-searched channel and the signal strength of the available AP are obtained.

4. The method according to claim 3, wherein the obtaining the available AP on each to-be-searched channel and the signal strength of the available AP each time the channel scanning is performed comprises:
when the mobile wifi device reaches a preset time, selecting an initial channel, and working during a first time as the AP on the initial channel;
after the mobile wifi device works during the first time, switching to one to-be-searched channel;
working, by the mobile wifi device, during a second time as the STA on the one to-be-searched channel, and detecting the available AP on the one to-be-searched channel and the signal strength of the available AP on the one to-be-searched channel;
after the mobile wifi device works during the second time, switching back to the initial channel;
after the mobile wifi device works during the first time as the AP again on the initial channel, switching to work during the second time as the STA on another to-be-searched channel, detecting the available AP on the another to-be-searched channel and the signal strength of the available AP on the another to-be-searched channel, and switching back to the initial channel after working during the second time; and
repeating, by the mobile wifi device, the above process until all the to-be-searched channels of the at least one to-be-searched channel are detected.

5. The method according to claim 4, wherein the performing the wifi access process on the channel where the target AP is located comprises:
performing, by the mobile wifi device, an AP release process on the initial channel;
connecting, by the mobile wifi device, to the target AP as the STA on the channel where the target AP is located; and
after the mobile wifi device connects to the target AP as the STA, working as the AP on the channel where the target AP is located, so that the STAs having the access demand re-access the mobile wifi device.

6. The method according to claim 5, wherein the target AP comprises a first AP, and the first AP refers to an AP of the mobile wifi device failing to access for a preset number of times, the method further comprising:
no longer initiating, by the mobile wifi device, an access to the first AP before restarting; or
before restarting, placing, by the mobile wifi device, a basic service set identifier BSSID of the first AP at the tail of a search queue to delay initiating the access to the first AP; or
within a preset time before restarting, maintaining, by the mobile wifi device, a state of the BSSID of the first AP as an invalid state so as to no longer initiate the access to the first AP within the preset time.

7. The method according to claim 2, wherein
when there is more than one available AP with the signal strength greater than the first threshold, or when there is more than one available AP with the weighted average value of multiple values of the signal strength greater than the first threshold, the target AP is an AP with the highest priority in the more than one AP, and the priority is determined by a pre-configured parameter indicating an AP selection sequence.

8. The method according to claim 2, wherein a calculation formula of the first threshold is: $L1=Y-P1+P2$, wherein L1 is the first threshold, Y is a receiver sensitivity required by the mobile wifi device working as the AP and the STA, P1 is a transmitting power of the mobile wifi device, and P2 is a transmitting power of the target AP.

9. The method according to claim 8, wherein when the mobile wifi device works in a battery mode and works in a charger mode, P1 has different values.

10. The method according to claim 1, further comprising:
determining, by the mobile wifi device, whether an Ethernet port of wide area network WAN ports is capable of providing the Internet access service; and
when the Ethernet port of the WAN ports is capable of providing the Internet access service, using, by the mobile wifi device, the Ethernet port to access a WAN.

11. A device for data traffic distribution, comprising:
a wireless transceiver, configured to: measure signal strength of a wireless interconnection wifi network, and send the signal strength of the wifi network to a processor, and when performing a wifi data service, collect multiple values of a wifi signal strength collected within a preset time and calculate a weighted average value of the multiple values of the wifi signal strength; and
the processor, configured to: receive the signal strength of the wifi network sent by the wireless transceiver, switch data traffic between a cellular wireless communication network and the wifi network according to the signal strength of the wifi network, wherein when the data traffic is transmitted over the wifi network, the mobile wifi device, by means of time division multiplexing, serves as an access point AP in a first time period and a station STA in a second time period respectively to route the data traffic between STAs having an Internet access demand and APs capable of providing an Internet access service; and if the weighted average value is lower than a preset third threshold, establish a cellular wireless communication network connection; after establishing the cellular wireless communication network connection, re-obtain the weighted average value, and if the weighted average value is lower than a preset fourth threshold, switch the data traffic from the wifi network to the cellular wireless communication network.

12. The device according to claim 11, wherein
the wireless transceiver is configured to: when performing a cellular wireless communication data service, respectively perform channel scanning on each to-be-searched channel of at least one to-be-searched channel in the wifi network, to obtain an available AP from the APs capable of providing the Internet access service on each to-be-searched channel and the signal strength of the available AP; and
the processor is configured to:
determine the available AP with signal strength greater than a preset first threshold or a weighted average value of multiple values of the signal strength greater than the first threshold as a target AP;
perform a wifi access process on the channel where the target AP is located so as to access the wifi network; and
after access the wifi network successfully, re-obtain the signal strength of the target AP, and if the re-obtained signal strength is greater than a preset second threshold, switch the data traffic from the cellular wireless communication network to the wifi network.

13. The device according to claim 12, wherein the wireless transceiver is configured to:
when performing the cellular wireless communication data service, respectively perform a preset number of times of channel scanning on each to-be-searched channel in the wifi network, wherein each time the channel scanning is performed, the available AP on each to-be-searched channel and the signal strength of the available AP are obtained.

14. The device according to claim 13, wherein the wireless transceiver is configured to:
when performing the cellular wireless communication data service, respectively perform a preset number of times of channel scanning on each to-be-searched channel in the wifi network, wherein the obtaining the available AP on each to-be-searched channel and the signal strength of the available AP each time the channel scanning is performed comprises:
when reaching a preset time, select an initial channel, and work during a first time as the AP on the initial channel;
after working during the first time, switch to one to-be-searched channel;
work during a second time as the STA on the one to-be-searched channel, and detect the available AP on the one to-be-searched channel and the signal strength of the available AP on the one to-be-searched channel;
after working during the second time, switch back to the initial channel;
after working during the first time as the AP again on the initial channel, switch to work during the second time as the STA on another to-be-searched channel, detect the available AP on the another to-be-searched channel and the signal strength of the available AP on the another to-be-searched channel, and switch back to the initial channel after working during the second time; and
repeat the above process until all the to-be-searched channels of the at least one to-be-searched channel are detected.

15. The device according to claim 14, wherein the processor is configured to:
perform an AP release process on the initial channel;
connect, as the STA, to the target AP on the channel where the target AP is located; and
after connecting to the target AP as the STA, work as the AP on the channel where the target AP is located, so that the STAs having the access demand re-access the mobile wifi device.

16. The device according to claim 15, wherein the target AP comprises a first AP, and the first AP refers to an AP of the mobile wifi device failing to access for a preset number of times, and
the processor is further configured to no longer initiate an access to the first AP before restarting; or before restarting, place a basic service set identifier BSSID of the first AP at the tail of a search queue to delay initiating the access to the first AP; or within a preset time before restarting, maintain a state of the BSSID of the first AP as an invalid state so as to no longer initiate the access to the first AP within the preset time.

17. The device according to claim 12, wherein when there is more than one available AP with the signal strength greater than the first threshold, or when there is more than one available AP with the weighted average value of multiple values of the signal strength greater than the first threshold, the target AP is an AP with the highest priority in the more than one AP, and the priority is determined by a pre-configured parameter indicating an AP selection sequence.

18. The device according to claim 12, wherein a calculation formula of the first threshold adopted by the processor is: $L1=Y-P1+P2$, where L1 is the first threshold, Y is a receiver sensitivity required by the mobile wifi device working as the AP and the STA, P1 is a transmitting power of the mobile wifi device, and P2 is a transmitting power of the target AP.

19. The device according to claim 18, wherein when the device works in a battery mode and works in a charger mode, P1 has different values.

20. The device according to claim 11, wherein the processor is further configured to determine whether an Ethernet port of wide area network WAN ports is capable of providing the Internet access service; and when the first determining module determines that the Ethernet port of the WAN ports is capable of providing the Internet access service, use the Ethernet port to access the WAN.

* * * * *